United States Patent [19]

Weber et al.

[11] Patent Number: 5,121,962
[45] Date of Patent: Jun. 16, 1992

[54] CUSHION FOR ABSORBING SHOCK DAMPING VIBRATION AND DISTRIBUTING PRESSURE

[75] Inventors: Frederic J. Weber, Waco, Tex.; Edmund R. Burke, Colorado Springs, Colo.

[73] Assignee: Spenco Medical Corporation, Waco, Tex.

[21] Appl. No.: 421,424

[22] Filed: Oct. 13, 1989

[51] Int. Cl.$^5$ .............................................. B62J 1/18
[52] U.S. Cl. .................................. 297/214; 297/199; 297/200
[58] Field of Search ............... 297/214, 218, 219, 224, 297/226, 199, 200

[56] References Cited

U.S. PATENT DOCUMENTS

| | | |
|---|---|---|
| 542,613 | 7/1895 | Johnston . |
| 595,111 | 12/1897 | Perry . |
| 602,732 | 4/1898 | Craig .................... 297/200 |
| 622,913 | 4/1899 | Cushing . |
| 630,266 | 8/1899 | Saddle . |
| 1,322,959 | 11/1919 | Sawasaki ................. 297/214 |
| 2,173,224 | 9/1939 | Bergwall . |
| 2,314,046 | 3/1943 | Kalter . |
| 2,343,996 | 3/1944 | Perry . |
| 2,558,389 | 6/1951 | Robinson . |
| 3,856,348 | 12/1974 | Bird . |
| 4,319,781 | 3/1982 | Tsuge . |
| 4,429,915 | 2/1984 | Flager . |
| 4,451,083 | 5/1984 | Marchello . |
| 4,471,578 | 9/1984 | Pomeranz et al. ......... 297/214 X |
| 4,611,851 | 9/1986 | Noyes . |
| 4,756,949 | 7/1988 | Spence . |
| 4,786,104 | 11/1988 | Fellenbaum . |
| 4,808,469 | 2/1989 | Hiles . |

FOREIGN PATENT DOCUMENTS

| | | | |
|---|---|---|---|
| 929287 | 6/1973 | Canada . | |
| 95352 | 1/1897 | Fed. Rep. of Germany | 297/200 |
| 433697 | 9/1925 | Fed. Rep. of Germany | 297/199 |
| 3001693 | 7/1981 | Fed. Rep. of Germany . | |
| 3436332 | 4/1986 | Fed. Rep. of Germany | 297/199 |
| 586813 | 1/1925 | France . | |
| 2367650 | 10/1976 | France . | |
| 2551717 | 3/1985 | France . | |
| 123440 | 11/1927 | Switzerland | 297/199 |
| 191718 | 6/1937 | Switzerland | 297/199 |

Primary Examiner—Laurie K. Cranmer
Attorney, Agent, or Firm—Thomas J. Connelly; Thomas M. Gage

[57] ABSTRACT

There is disclosed a cushion for absorbing energy to dampen vibration, distribute pressure and absorb shock. The cushion has a deformable polyurethane bladder which defines a chamber adapted to contain a fluid, such as air. A piece of viscoelastic material, such as a highly plasticized PVC gel, may be located inside the bladder so that when air is introduced into the chamber, the cushion is capable of absorbing energy to dampen low amplitude vibration, distribute pressure and absorb high amplitude shock. The cushion has a valve in fluid communication with the chamber for selectively varying the amount of air so that the shock absorbing capability of the cushion may be varied.

Various embodiments incorporating the cushion are disclosed, including a removable bicycle saddle pad, a bicycle saddle, a wheelchair seat pad and a cyclist's glove.

8 Claims, 5 Drawing Sheets

CUSHION FOR ABSORBING SHOCK DAMPING VIBRATION AND DISTRIBUTING PRESSURE

BACKGROUND OF THE INVENTION

The present invention relates to cushions, and more particularly to cushions utilizing air and gel to dampen vibration, absorb shock and distribute pressure.

Those who ride bicycles and other types of transport often suffer painful tissue damage on their hands or buttocks from contact with hard surfaces. To avoid this damage cushions of various shapes and configurations are employed to deal with the complex effects of prolonged contact, vibration, and shock at the human body/vehicle surface interface.

Prolonged contact of tissues with a hard surface can restrict the flow of blood. This may lead to ischemia of the skin, sometimes referred to as "saddle sores", and, ultimately, more serious ischemic ulcers. The severity of the tissue damage depends on both time and intensity of pressure at the point or area of contact. Elderly or crippled persons are often tormented by the acute pain of prolonged contact when they sit for long periods of time in a wheelchair without repositioning. Paradoxically, active sports enthusiasts may also suffer from the effects of prolonged contact; bicycle riders in long races have experienced saddle sores. The distressing effects of prolonged surface contact may be reduced through use of a cushion which increases the area of contact by conforming to the irregular surfaces of the body. This reduces pressure on the tissues and permits circulation.

Vibration is a regular periodic transfer of energy which may be transmitted to a rider by contact with a surface having rapid rhythmic movement back and forth. Among other effects, vibration causes fatigue. Bicycle riders, for example, may suffer fatigue from vibration inflicted by a bicycle driven at higher speeds over a hard surface, such as a paved street. These effects may be reduced by interposing an energy absorbing medium between the vibrating surface and the body. This lowers the amplitude of the vibration on the body, which, consequently reduces the amount of energy that is transferred.

Shock, the transfer of high amplitude energy to a person, can cause serious trauma—tissues or bones may be fractured or crushed instantly upon impact with a hard surface. Shock is likely to occur, for example, when one rides a bicycle over a rough surface, such as an unpaved road. When the bicycle hits an obstruction, such as a rock or pothole, the abrupt displacement of the vehicle is transmitted directly through the rigid frame, seat, and control surfaces to the rider. Shock may be reduced by interposing a medium capable of absorbing high displacement amplitude energy between contact surfaces and the rider.

Vehicle riders are often exposed to all of these forces simultaneously. Modern vehicles are designed for flexible multi-mode operation over a variety of surfaces. For example, self propelled wheelchairs are capable of traversing stairs as well as smooth surfaces. High tech bicycles are designed for both on and off the road operation. The use of vehicles over various surfaces may subject the rider to the simultaneous effects of shock, vibration, and long term contact pressure. Air has been and is used as a cushioning medium in pneumatic cushions. Air absorbs shock because it acts like a spring when constrained in a container of variable volume; the container becomes progressively stiffer when compressed by shock displacement. Pneumatic cushions thus have a positive vertical spring rate, which determines how far a person sinks into the cushion.

Pneumatic cushions when maintained at a low pressure have proven unsatisfactory in that they may bottom out against a hard underlying surface when compressed by a shock displacement equal to the thickness of the cushion, which may expose the user to vibration and excessive contact pressure. Conversely, when at high pressure the pneumatic cushion may provide satisfactory shock absorption and distribution of pressure, but still permit the transmission of vibration energy.

Gel-like viscoelastic materials have also been used as a cushioning medium. Such materials are generally incompressible and exhibit both viscous and elastic properties. When subjected to vibration, viscoelastic materials produce a retardation of the effect of the forces acting on the body, which introduces hysteresis into the cycle, and represents a loss of resilient energy. This reduces or dampens vibration. Moreover, upon contact with an object, viscoelastic materials deform slightly thereby absorbing shock and conforming to the surface of the object. This action produces an essentially hydrostatic pressure envelope around the object, which is desirable because it maximizes the area of contact and lowers pressure in tissues.

Gel-like viscoelastic materials also have proven difficult to use because they are heavy, and do not absorb shock adequately due to their relative incompressibility.

As used herein, the term "viscoelastic material" means a substance which when subjected to a very rapidly applied stress, undergoes a deformation proportional to the stress and shows a recovery if the stress is very rapidly removed. If the stress is applied slowly or over a long period of time, the substance behaves somewhat like a viscous liquid: it will show a continued deformation with time, the rate of deformation being proportional to the applied stress. Examples of substances meeting this requirement include silicone gels, vinyl plastisols and polyurethane elastomers.

OBJECTS OF THE INVENTION

It is an object of the present invention to provide a cushion capable of damping vibration, distributing pressure and absorbing shock.

Another object of the present invention is to provide a cushion capable of damping vibration, distributing pressure and absorbing shock, which, in certain embodiments, has adjustable energy absorbing capability.

Another object of the present invention is to provide a cushion which absorbs shock upon initial deflection by an object, and thereafter, provides hydrostatic pressure distribution on the object.

Still further objects and the scope of the present invention will become apparent to those of skill in the art from the details given hereinafter. It should be understood that the detailed descriptions of the presently preferred embodiments given herein are given only for illustration. Various changes and modifications well within the spirit and scope of the invention will become apparent to those of skill in the art in view of this detailed description.

SUMMARY OF THE INVENTION

The present invention provides a cushion for absorbing energy to dampen vibration, distribute pressure and absorb shock. The cushion has a deformable bladder which defines a chamber for containing a fluid. Viscoelastic material is located in operable relationship to the bladder so that when a fluid is introduced into the chamber, the cushion is capable of absorbing energy to dampen low amplitude vibration, distribute pressure and absorb high amplitude shock. The cushion may have a valve in fluid communication with the chamber for selectively varying the amount of fluid so that the shock absorbing capability of the cushion may be varied.

DETAILED DESCRIPTION OF THE INVENTION

Figure 1:
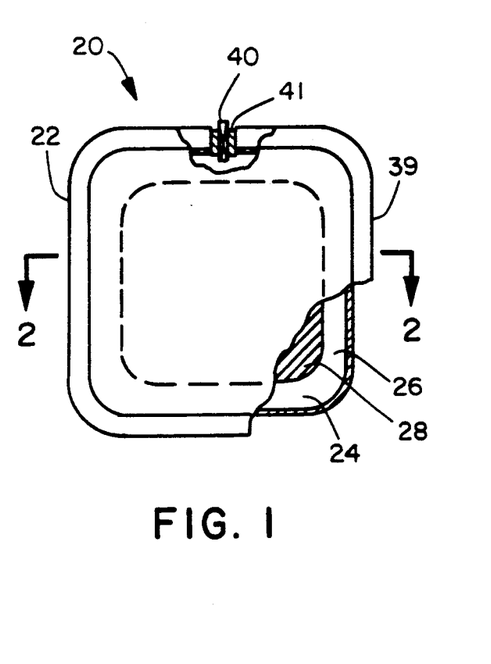
FIG. 1 depicts a plan view of one embodiment of a cushion of the present invention.

Referring now to the drawings, wherein the same reference numerals represent the same or equivalent structure, and in particular to FIG. 1, there is shown one embodiment of a cushion 20 of the present invention. The cushion 20 has a deformable bladder 22 which defines a chamber 24 for containing a fluid 26. Viscoelastic material 28 is disposed in operable relationship to the bladder 22 so that when a fluid 26 is deposed within the chamber 24, the cushion 20 is capable of dampening vibration, distributing pressure and absorbing shock. A valve 40 provides fluid communication with the chamber 24 for selectively varying the amount of fluid 26 therein so that the shock absorbing capability of the cushion 20 may be varied. As used herein, the term "operable relationship" means a structural disposition of the bladder 22 and the viscoelastic material 28 in such manner that both performing in combination act to affect the shock absorption, vibration dampening and pressure distribution of cushion 20 or other embodiment of the present invention. For example, the viscoelastic material may be within the chamber; or outside the chamber but within the bladder, in a separate cavity; or outside the chamber, above, below or beside the bladder, but in close proximity to the bladder.

The fluid 26 is desirably air, but may be a liquid or a compressible gas. Suitable gases are well known to those skilled in the art and include carbon dioxide, nitrogen, hydrogen, argon, freon and the like. Suitable liquids include water and low viscosity oils.

Figure 2:
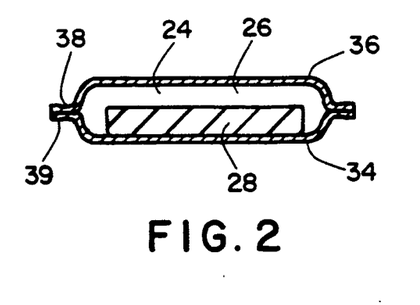
FIG. 2 depicts a cross-sectional view of the cushion of FIG. 1, taken along line 2—2.

With reference to FIG. 1 and FIG. 2, a process for making one embodiment of the cushion 20 of the present invention will be described. The process comprises the steps of (1) forming the deformable bladder 22, (2) forming the piece of viscoelastic material 28, (3) disposing the viscoelastic material 28 within the bladder 22, and (4) sealing the bladder 22. The process also includes the step of (5) installing a valve 40 in the bladder 22. When adjustability of the pressure of the fluid 26 is not required, the valve 40, and its installation may be eliminated.

Step 1, forming the deformable bladder 22, may be carried out by providing a sheet of bladder material and shaping the material into an upper sheet 36 and a lower sheet 34.

Generally, the material for the bladder 22 may, for example, be any material that is fluid impervious and slightly elastic. The degree of elasticity is selected depending on how compressible the fluid 26 is, or the nature of the impact forces to be dissipated. The material may, for example, be a plastic film. If so, the tensile modulus may range from 400 pounds per square inch to 2000 pounds per square inch at 100 percent elongation, more desirably from about 600 pounds per square inch to 1500 pounds per square inch at 100 percent elongation, and the Shore A hardness may range from about 70 to about 100, more desirably from 78 to 95. The thickness may range from about 1 mil (0.001 inch) to about 100 mils (0.1 inch), more desirably from about 2 mils (0.002 inch) to about 55 mils (0.055 inch).

One material for the bladder 22 is a clear polyester based polyurethane film which has a specific gravity of 1.19, a Shore A Durometer Hardness of 85, an ultimate tensile strength of 8500 pounds per square inch, an ultimate elongation of 500 percent, a tensile modulus of 1200 pounds per square inch at 100 percent elongation, a tear resistance of 700 pounds per linear inch and a low temperature brittle point of −80 degrees Fahrenheit, known as TF-840, available in roll form from Lord Corporation, Film Products Division of Erie, Pa.

Shaping the bladder 22 material may be accomplished by die stamping a roll form sheet of bladder material into the desired final shape of the cushion.

Step 2, forming the viscoelastic material 28, may be carried out by preparing a viscoelastic gel and molding the gel into the desired shape.

A suitable gel for the viscoelastic material 28 may, for example, be a vinyl plastisol composition containing a minor portion of polyvinylchloride ("PVC") resin and a major portion of dialkyl phthalate plasticizer in a final weight ratio of plasticizer to resin of from about 4:1 to about 12:1, more desirably about 7:1 to about 11:1. The ratio refers to the "make up" ratio which are the amounts of resin and plasticizer used in formulating the composition. Some plasticizer is lost during processing, resulting in the product gel having a somewhat lower ratio. With these compositions, the hardness of the final gel depends of the amount of plasticizer employed. A higher ratio yields a softer gel, while a lower ratio produces a firmer gel.

Preparing a PVC gel for the present invention may be accomplished by (1) adding about 41 parts by weight of a dialkyl phthalate plasticizer to a mixing tank; (2) admixing about 5 parts by weight of an epoxidized soybean oil stabilizer and about 6 parts by weight of a metallic salt stabilizer into the dialkyl phthalate to form a mixture; (3) admixing approximately 100 parts by weight of PVC resin to the mixture; (4) heating the mixture and adding more plasticizer until the ratio of plasticizer to resin is about 1.5:1 to form a resin concentrate; (5) admixing about 3 parts by weight of dialkyl phthalate plasticizer, with about 1 part by weight of resin concentrate and admixing an optional coloring agent, to form a vinyl plastisol; (6) continually stirring the plastisol and heating it to maintain a temperature of from about 100 degrees to about 115 degrees Fahrenheit.

The plasticizer may be dialkyl phthalate having a molecular weight of about 414, a boiling point of about 252° C., a specific gravity of 0.97, a viscosity of 41 centistokes, and mixed $C_7$, $C_9$, and $C_{11}$ predominantly linear alkyl groups, known as "Platinol 711 P", available from BASF Corporation of Parsippany, N.J.

The epoxidized soybean oil may be a stabilizer for PVC derived by the epoxidation of naturally occurring unsaturated soya bean oil having a density of 0.99 grams per milliliter, a viscosity of 3 to 7 poise and an oxirane number of at least 7.0, known as "Plastoflex 2307," available from AKZO Chemie America of New Brunswick, N.J.

The metallic salt stabilizer may be Barium Zinc phenate having a specific gravity of 1.0 grams per cubic centimeter, and a Gardner viscosity rating of "E", known as "Synpron 1780", available from Synthetic Products Corporation of Cleveland, Ohio.

The resin may be a high molecular weight PVC homopolymer dispersion resin as classified D5-22 in ASTM Standard D-1755, having a relative viscosity of about 2.83, an inherent viscosity (per ASTM D-1243) of 1.27, a Fikenstscher K value of 78, and a specific gravity of about 1.4 (per ASTM D-792), known as "VC 1069", available from Borden Chemicals and Plastics of Geismar, La.

Molding the gel into the desired shape may be carried out by (1) extruding the vinyl plastisol into a mold; (2) allowing it to cool to form a viscoelastic material; and (3) removing the material from the mold. During the extrusion process the vinyl plastisol should enter the extruder at a temperature of from about 100 degrees F. to about 115 degrees F. and should exit the extruder into the mold at a temperature of from about 330 degrees F. to about 350 degrees F.

Step 3, disposing the viscoelastic material 28 within the bladder, may be carried out by positioning a piece of viscoelastic material 28 on the lower sheet 34 and aligning the upper sheet 36 with the lower sheet 34.

Step 4, sealing the deformable bladder 22 may be accomplished by attaching the sheets together with a peripheral seam 38, to form the bladder. The peripheral seam 38 may be formed by welding the sheets together with a dielectric welding apparatus.

Optional Step 5, installing a valve means, may be accomplished by positioning a tube 41 between the upper sheet 36 and the lower sheet 34, before the sealing step, then welding the sheets together so as to seal around the tube 41, and, finally, inserting a valve 40 inside the tube 41.

The valve 40 permits the fluid 26 to be introduced into, or removed from the deformable bladder. Generally, it may be any device that is able to transfer either liquids or gases from a source of higher pressure, such as a manual hand pump, to the bladder, and hold or release controlled amounts of either fluids or gases on demand.

A particular device that can be used for the valve 40 is a Luer style check valve known as "Series 810 SCS" available from Halkey Medical Division of Halkey-Roberts Co. of St. Petersburg, Fla. Other devices that may be used for the valve 40 include automatic check type valves utilizing a traditional Schraeder core, twist closure body type insertion valves such as Roberts Body type AS or AC, shank type insertion valves, duckbill type check valves, manual metering valves, permeable membranes, and a remote fluid reservoir connected to the bladder.

The tube 41 may be a short length of ⅜ inch outside diameter polyurethane plastic tubing.

Once the cushion 20 is thus formed, air may be introduced into the deformable bladder 22 to a pressure selected to provide the desired energy absorbing characteristics. The pressure may be, for example, from about 1 pound per square inch (gauge) to about 5.0 pounds per square inch, more desirably from about 0.1 pounds per square inch to about 0.5 pounds per square inch.

Figure 3:
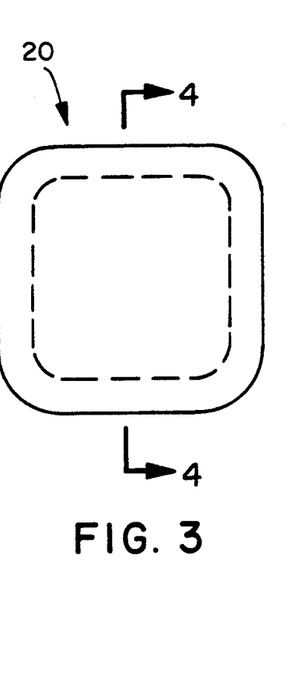
FIG. 3 a plan view of a second embodiment of the cushion of the present invention.
Figure 4:
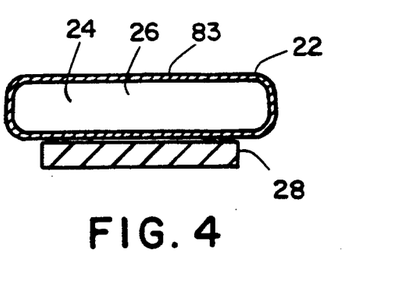
FIG. 4 depicts a cross-sectional view of the cushion of FIG. 3, taken along line 4—4.

FIG. 3 and FIG. 4 depict a second embodiment of the cushion 20 of the present invention. The cushion 20 has a deformable bladder 22 which defines a chamber 24 for containing a fluid 26. Viscoelastic material 28 is disposed in operable relationship to the bladder so that when a fluid 26 is deposed within the chamber 24, the cushion 20 is capable of absorbing energy to dampen vibration, distribute pressure and absorb shock. In this embodiment, viscoelastic material 28 may be disposed outside the chamber 24, below the deformable bladder 22.

To further enhance the energy absorption characteristics of the cushion 20 and thus render the cushion 20 more comfortable, the top surface 83 of the cushion 20 may be covered with a foam rubber sheet, or a quilted bonded fiber cover.

Figure 5:
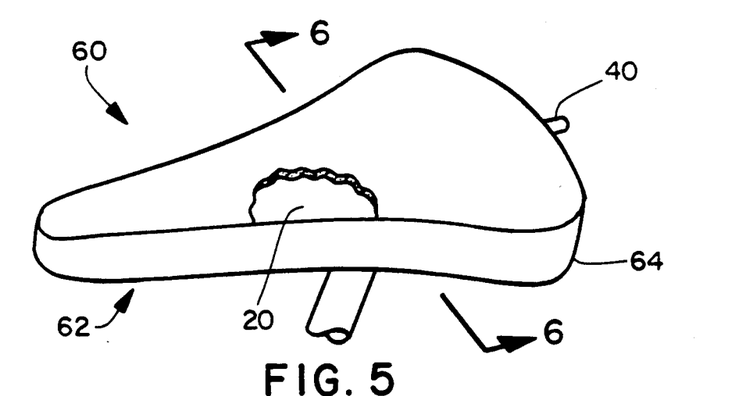
FIG. 5 depicts an isometric view of a removable bicycle pad of the present invention.
Figure 6:
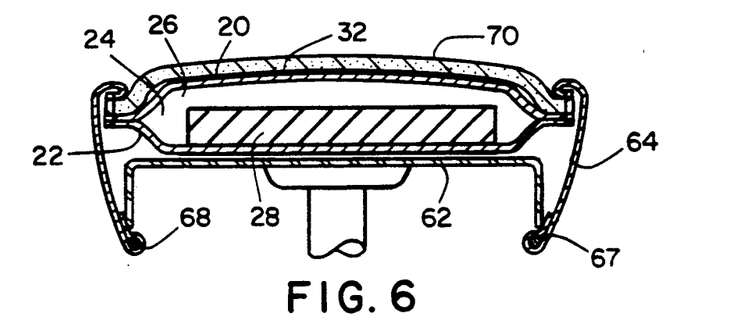
FIG. 6 a cross-sectional view of the pad of FIG. 5, taken along line 6—6.
Figure 7:
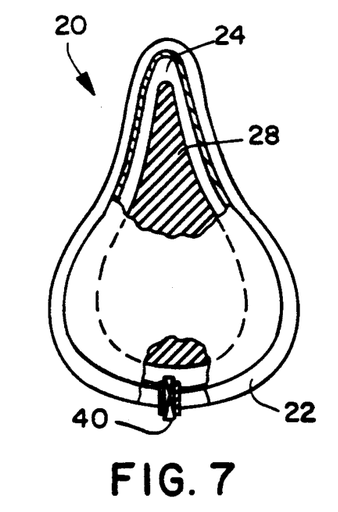
FIG. 7 depicts a plan view of the cushion used in the pad of FIG. 5.

FIG. 5, FIG. 6 and FIG. 7 depict a removable bicycle pad 60 incorporating an embodiment of the cushion 20 of the present invention. The cushion 20 used in the pad is in elongated teardrop shape and is adapted to fit over a bicycle seat 62. The cushion 20 has a deformable bladder 22 made of 10 mil polyester based polyurethane film defining a chamber 24 for containing a fluid, which in this embodiment, is air. A viscoelastic material 28 is disposed within the chamber 24 so that when air is introduced into the chamber 24, the cushion 20 dampens vibration, distributes pressure and absorbs shock.

In this embodiment, if a vinyl plastisol composition containing a minor portion of polyvinylchloride ("PVC") resin and a major portion of dialkyl phthalate plasticizer is used for the viscoelastic material 28, it is desirable that the final weight ratio of plasticizer to resin be about 7:1 to about 10:1, more desirably about 9:1.

A valve 40 is in fluid communication with the chamber 24 for selectively varying the amount of air therein, so that the shock absorbing capability of the cushion 20 may be adjusted.

The bicycle pad 60 has a skirt 64 for securing the pad to a bicycle seat 62. The skirt 64 may be a die cut piece of woven elastic polypropylene fabric sewn to the perimeter flange 39 of the cushion 20, extending therefrom, and terminating in a bottom edge folded over so as to define a tunnel 67. A drawstring 68 may be disposed in the tunnel 67 for tightening the skirt 64 securely around the bicycle seat 62.

Additionally, the bicycle pad 60 has a pad cover 70 in contact with the cushion. It is desirable that the cover be in sliding contact with the outer surface 32 of the cushion 20, so that the cover can move with respect thereto, for reducing friction between the cover and the cushion. One desirable material for the pad cover 70 is a 0.125 to 0.250 inch thick natural rubber mixed cell foam laminate having a density of 16 pounds per cubic foot, a tensile strength of 125 pounds per square inch, an elongation value of 350 percent, a compression deflection of 5-10 pounds per square inch at 25 percent deflection, a compression set of 2 percent at 50 percent deflection for 22 hours at 70 degrees Fahrenheit, known as "Item 3122LW", available from Griswold Rubber Company of Moosup, Connecticut.

Figure 8:
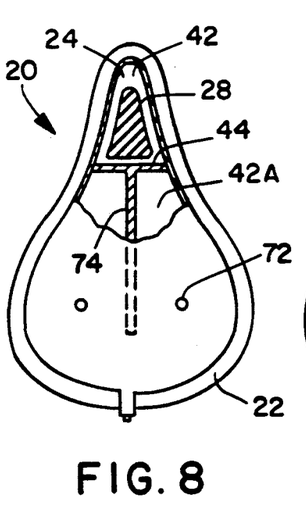
FIG. 8 depicts a plan view of a second embodiment of the cushion used in a removable bicycle pad.

FIG. 8 depicts a second embodiment of the cushion 20 used as a bicycle pad 60. Here, the chamber 24 may be divided, by a continuous interior wall 44, into a first cavity 42 and a second cavity 42A so that the cavities 42, 42A are in fluid isolation from each other. Viscoelastic material 28 may be disposed within the first cavity 42 only, while the second cavity 42A contains air. Additionally, the deformable bladder 22 has two spot welds 72 and an open interior wall 74. These features function to restrain expansion of the bladder, and control the distribution of air within the bladder. The number of spot welds 72 is optional and more or less than two may be effective.

Figure 9:
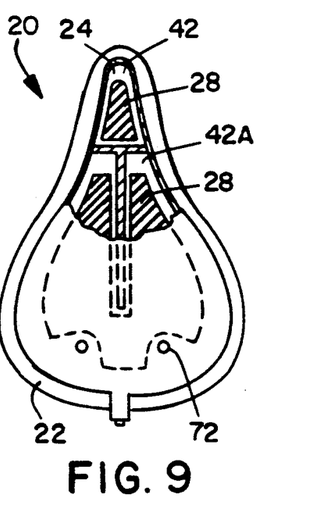
FIG. 9 depicts a plan view of a third embodiment of the cushion used in a removable bicycle pad.

FIG. 9 depicts yet a third embodiment of the cushion 20 used as a bicycle pad 60. The chamber 84 may be divided by a continuous interior wall 44 into a first cavity 42 and a second cavity 42A so that the cavities 42, 42A are in fluid isolation. In this embodiment, viscoelastic material 28 may be disposed within the first cavity 42 and within the second cavity 42A, while the second cavity 42A also contains air.

Figure 10:
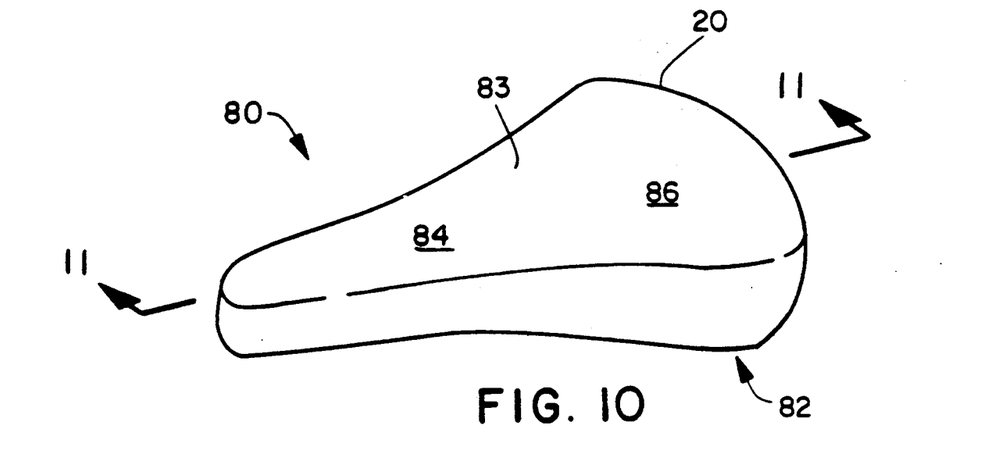
FIG. 10 depicts an isometric view of a bicycle saddle of the present invention.
Figure 11:
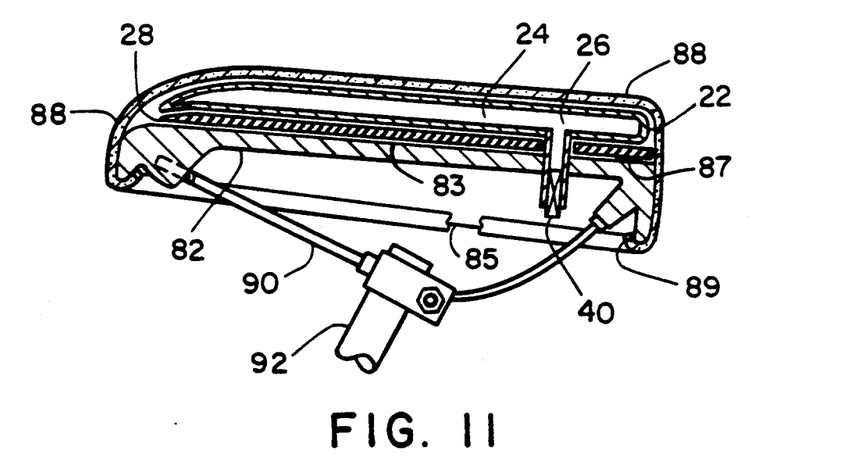
FIG. 11 depicts a cross-sectional view of the saddle of FIG. 11, taken along line 11—11.

FIG. 10 and FIG. 11 depict a bicycle saddle 80 incorporating the cushion 20 of the present invention. The bicycle saddle 80 has a saddle base 82 with a top surface 83 which defines a horn area 84, a lower edge 85 and a rear area 86. The cushion 20 may be attached to the top surface 83 by a suitable composition 87 for adhering the bladder to the base, such as, for example, polyurethane foam. The cushion 20 includes a deformable bladder 22 of 5 to 10 mil thick, polyester based polyurethane film, which defines a chamber 24 for containing a fluid 26, which in this embodiment is air. In this embodiment, a viscoelastic material 28 may be outside the chamber 24, below the deformable bladder 22, but in close proximity to the bladder.

In this embodiment, if a vinyl plastisol composition containing a minor portion of polyvinylchloride ("PVC") resin and a major portion of dialkyl phthalate plasticizer is used for viscoelastic material 28, it is desirable that the final weight ratio of plasticizer to resin be about 7:1 to about 10:1, more desirably about 9:1.

A valve 40 may be in fluid communication with the chamber 24 for selectively varying the amount of air therein so that the energy absorbing capability of the cushion 20 may be varied.

The bicycle saddle 80 also has a saddle cover 88 in sliding contact with the cushion. The cover may be attached to the saddle base 82 around the lower edge 85 thereof by staples 89, or any suitable means such as a screw tightened clamp. One desirable material for the saddle cover 88 is a 0.125 to 0.250 inch thick natural rubber mixed cell foam laminate having a density of 16 pounds per cubic foot, a tensile strength of 125 pounds per square inch, an elongation value of 350 percent, a compression deflection of 5-10 pounds per square inch at 25 percent deflection, a compression set of 2 percent at 50 percent deflection for 22 hours at 70 degrees Fahrenheit, known as "Item 3122LW", available from Griswold Rubber Company of Moosup, Conn.

For attachment to a bicycle, the base 82 may be equipped with rails 90 for securing the bicycle to a bicycle frame post 92.

Figure 12:
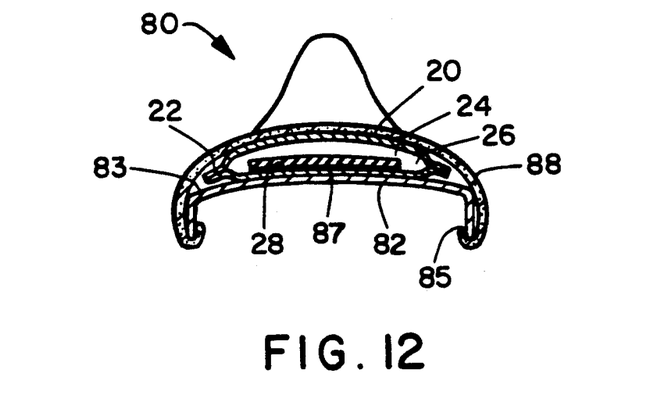
FIG. 12 a lateral cross-sectional view of a second embodiment of a bicycle saddle of the present invention.

FIG. 12 depicts a lateral cross-sectional view of a second embodiment of the cushion 20 of the present invention used in a bicycle saddle 80. The cushion 20 used in the pad may be in elongated teardrop shape so that it covers essentially all of the top surface 83 of the base 82. The cushion 20 has a deformable bladder 22 defining a chamber 24 for containing a fluid 26. In this embodiment, a viscoelastic material 28 may be disposed within the chamber 24. The bicycle saddle so also has a saddle cover 88 in sliding contact with the cushion, which may be also attached to the saddle base 82 around the lower edge 85 thereof.

Figure 13:
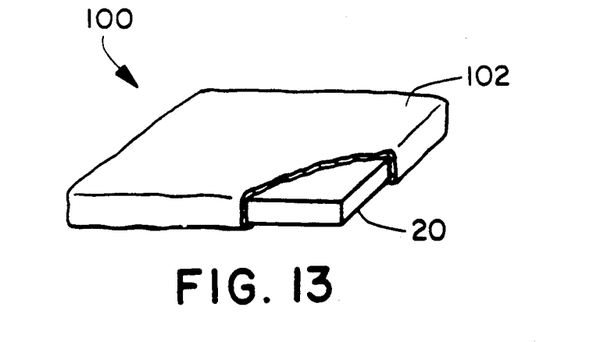
FIG. 13 depicts an isometric view of a wheelchair seat pad incorporating the cushion of the present invention.
Figure 14:
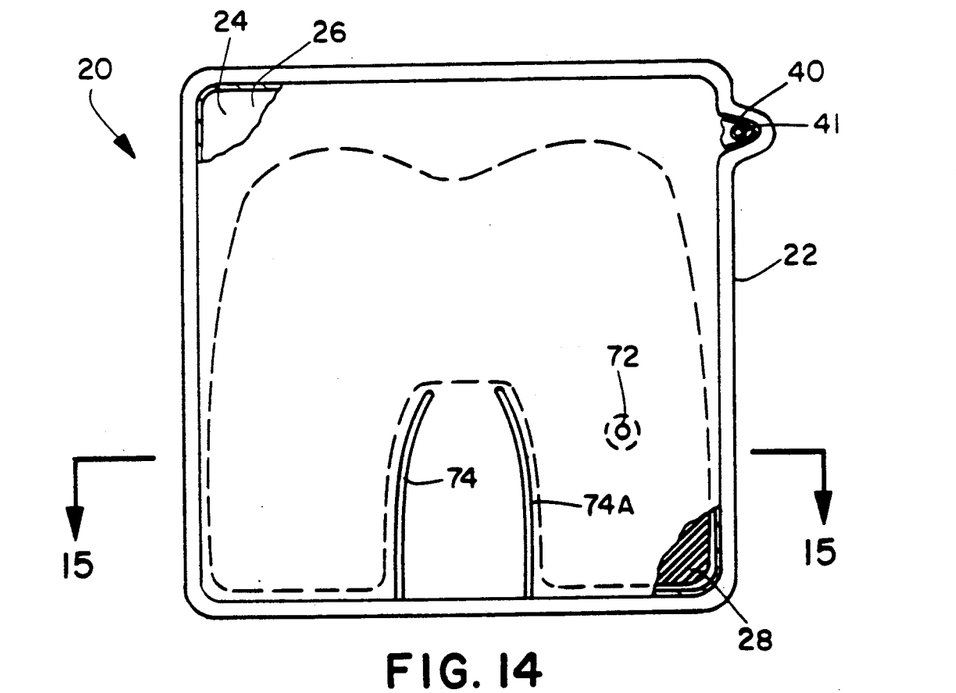
FIG. 14 depicts a plan view of the cushion used in the pad of FIG. 13.
Figure 15:
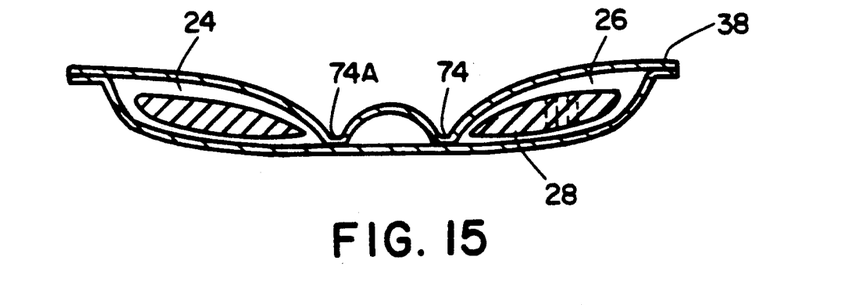
FIG. 15 depicts a cross-sectional view of the cushion of FIG. 14, taken along line 15—15.

FIG. 13, FIG. 14 and FIG. 15 depict a wheelchair seat pad 100 incorporating the cushion 20 of the present invention. The cushion 20 includes a deformable bladder 22 defining a chamber 24 for containing a fluid 26, such as air, and viscoelastic material 28 within the chamber 24.

In this embodiment, if a vinyl plastisol composition containing a minor portion of polyvinylchloride ("PVC") resin and a major portion of dialkyl phthalate plasticizer is used for viscoelastic material 28, it is desirable that the final weight ratio of plasticizer to resin be about 8:1 to about 11:1, more desirably about 10:1.

The cushion 20 has a valve 40 in fluid communication with the chamber 24 for selectively varying the amount of fluid 26 therein.

Additionally, the bladder has a plurality of spot welds 72 and two interior walls 74 and 74A, to restrain expansion of the bladder, and control the distribution of air within the bladder.

The wheelchair seat pad 100 also has a seat cover 102 at least partially encapsulating the cushion. One desirable material for the seat cover 102 may be a laminate with a backing of 100 percent polyester 1.5 ounce per square yard bonded fiber, covered by a knitted, quilted fabric of 100 percent acrylic; 50 percent Rayon, 50 percent Polyester with a 62 percent bonded fiber and a 38 percent face knit weight.

A particular device that can be used for the valve 40 is a Luer style check valve known as "Series 810 SCS" available from Halkey Medical Division of Halkey-Roberts Co. of St. Petersburg, Fla. The valve is inserted into a right angled tube 41 that has been dielectrically welded through the bottom of the bladder tab. A suitable device for the tube 41 is known as "167AC", available from Halkey Medical.

Figure 16:
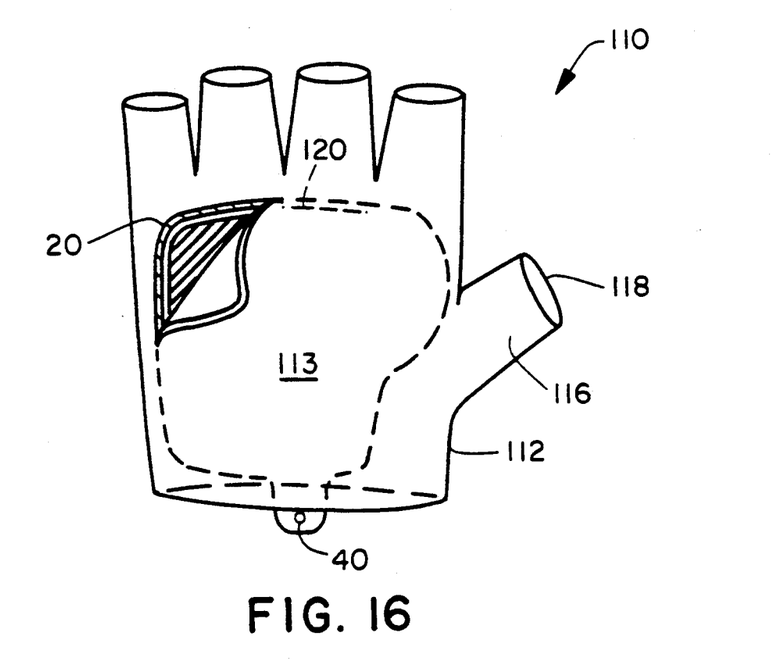
FIG. 16 depicts a front elevational view of a cyclist's glove incorporating the cushion of the present invention.
Figure 17:
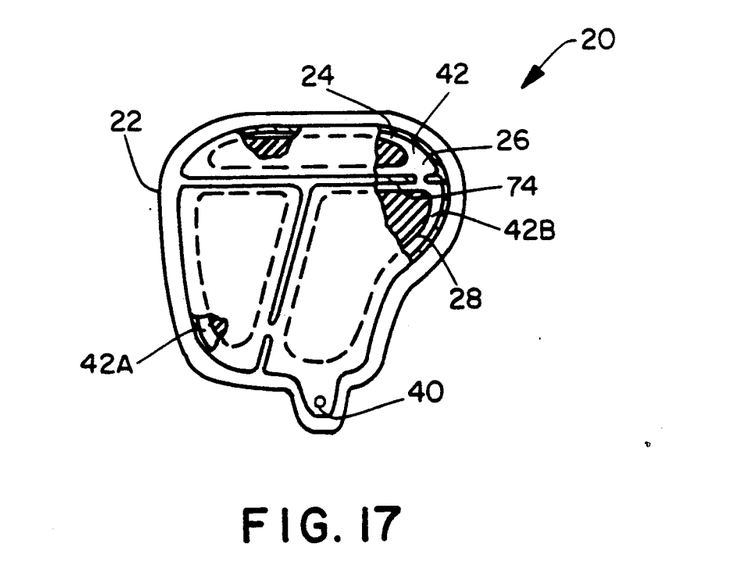
FIG. 17 depicts a plan view of the cushion used in the glove of FIG. 16.

FIG. 16 and FIG. 17 depict a cyclist's glove 110 incorporating the cushion 20 of the present invention.

The glove includes a glove body 112 which has a cushion 20 attached in the interior palm area 113 of the glove body 112. The cushion 20 includes a deformable bladder 22 defining a chamber 24 for containing a fluid, and viscoelastic material 28 in the chamber, so that when a fluid 26 is deposed within the chamber, the cushion 20 is capable of damping vibration, distributing pressure and absorbing shock.

In this embodiment, if a vinyl plastisol composition containing a minor portion of polyvinylchloride ("PVC") resin and a major portion of dialkyl phthalate plasticizer is used for the viscoelastic material 28, it is desirable that the final weight ratio of plasticizer to resin be about 7:1 to about 10:1, more desirably about 9:1.

The chamber 24 may be subdivided into three cavities 42, 42A, and 42B by an open interior wall 74, so that the cavities are in fluid communication with each other.

The cushion 24 has a valve 40 in fluid communication with the chamber 24 for selectively varying the amount of fluid 26 therein. The cushion 20 may be attached to the glove body 112 by a stitched seam 120.

A particular device that can be used for the valve 40 is a duckbill type check valve known as "VA 3143" available from Vernay Laboratories of Yellow Springs, Ohio.

The glove body 112 has a glove front 116 and a glove back 118, which are attached by sewn seams. The glove front 116 may be made of a pearled pigskin leather. The glove back 118 may be made of a suitable elastic fabric such as "Lycra" available from Penn Elastic.

While the present invention has been described in connection with certain preferred embodiments, it is to be understood that the subject matter encompassed in the present invention is not to be limited to those specific embodiments. On the contrary, it is intended for the subject matter of the invention to include all alternatives, modifications and equivalents as can be included within the spirit and scope of the claims.

What is claimed is:

1. A removable bicycle saddle pad comprising:
   a cushion for dampening vibration, distributing pressure and absorbing shock, the cushion including a deformable bladder having a chamber adapted to contain fluid, a viscoelastic material disposed within the bladder, and valve means for selectively varying the amount of fluid in the chamber to enable the shock absorbing capability of the cushion to be varied; and
   attachment means for removably securing the cushion to a bicycle saddle.

2. The pad of claim 1 wherein
   the attachment means comprises a skirt of elastic material extending from the perimeter flange of the cushion.

3. The pad of claim 1, further comprising
   a cover in sliding contact with the cushion.

4. The pad of claim 3, wherein
   the cover comprises a mixed cell foam.

5. The removable bicycle saddle pad of claim 1, wherein the viscoelastic material comprises a minor portion of polyvinylchloride resin and a major portion of dialkyl phthalate plasticizer in a weight ratio of plasticizer to resin of from about 7:1 to about 10:1.

6. A removable bicycle saddle pad, comprising:
   a cushion for dampening vibration, distributing pressure and absorbing shock, the cushion including:
   (a) a deformable bladder having a chamber adapted to contain air, the deformable bladder formed of a polyurethane film;
   (b) a viscoelastic material disposed within the chamber, the viscoelastic material including a minor portion of polyvinylchloride resin and a major portion of dialkyl phthalate plasticizer in a weight ratio of plasticizer to resin of form about 7:1 to about 10:1; and
   (c) valve means for selectively varying the amount of air in the chamber to enable the shock absorbing capability of the cushion to be varied;
   a cover constructed of a natural rubber, mixed cell foam laminate; and
   attachment means for removably securing the cushion and the cover to a bicycle saddle, the attachment means including a skirt of elastic material extending from the perimeter edge of the bladder.

7. A cushion for dampening vibration, distributing pressure and absorbing shock comprising:
   a deformable bladder having a chamber adapted to contain a fluid; and
   a viscoelastic material disposed within the bladder, wherein the viscoelastic material is a gel comprising a minor portion of polyvinylchloride resin and a major portion of dialkyl phthalate plasticizer in a weight ratio of plasticizer to resin of from about 7:1 to about 10:1.

8. A cushion for dampening vibration, distributing pressure, and absorbing shock comprising:
   a deformable bladder having a chamber adapted to contain fluid;
   a viscoelastic material disposed within the bladder; and
   valve means for selectively varying the amount of fluid within the chamber to enable the shock absorbing capability of the cushion to be modified.

* * * * *